(12) United States Patent
Poos

(10) Patent No.: US 10,271,560 B2
(45) Date of Patent: Apr. 30, 2019

(54) BRINE INJECTION SYSTEM WITH A FILTER

(71) Applicant: GEA Food Solutions Bakel B.V., EN Bakel (NL)

(72) Inventor: Willem Poos, Hertogenbosch (NL)

(73) Assignee: GEA FOOD SOLUTIONS BAKEL B.V., Bakel (NL)

( * ) Notice: Subject to any disclaimer, the term of this patent is extended or adjusted under 35 U.S.C. 154(b) by 153 days.

(21) Appl. No.: 15/527,064

(22) PCT Filed: Nov. 20, 2015

(86) PCT No.: PCT/EP2015/077186
§ 371 (c)(1),
(2) Date: May 16, 2017

(87) PCT Pub. No.: WO2016/083250
PCT Pub. Date: Jun. 2, 2016

(65) Prior Publication Data
US 2018/0279636 A1    Oct. 4, 2018

(30) Foreign Application Priority Data
Nov. 26, 2014 (EP) ................... 14194983

(51) Int. Cl.
*A23B 4/02* (2006.01)
*A23B 4/28* (2006.01)
(Continued)

(52) U.S. Cl.
CPC .......... *A23B 4/285* (2013.01); *B01D 29/0097* (2013.01); *B01D 29/6453* (2013.01);
(Continued)

(58) Field of Classification Search
CPC ...... A23B 4/285; B01D 33/801; B01D 33/06; B01D 33/327; Y02A 40/946
(Continued)

(56) References Cited

U.S. PATENT DOCUMENTS 2,814,388 A   11/1957  Fontein et al.
4,286,510 A    9/1981  Prosenbauer
(Continued)

FOREIGN PATENT DOCUMENTS

DE          20107087 U1  10/2001
DE     202010000494 U1   8/2011
(Continued)

OTHER PUBLICATIONS

International Search Report and Written Opinion for International Application No. PCT/EP2015/077186, dated Feb. 2, 2016.
(Continued)

*Primary Examiner* — Patrick F Brinson
(74) *Attorney, Agent, or Firm* — The Dobrusin Law Firm, P.C.

(57) ABSTRACT

The present invention relates to a brine injection system with a plurality of needles, which are inserted into a product and through which brine is injected into the product, wherein brine which does not end up in the product is collected and recycled and wherein during recycling, the brine flows through a filter.

20 Claims, 3 Drawing Sheets

Figure 1:
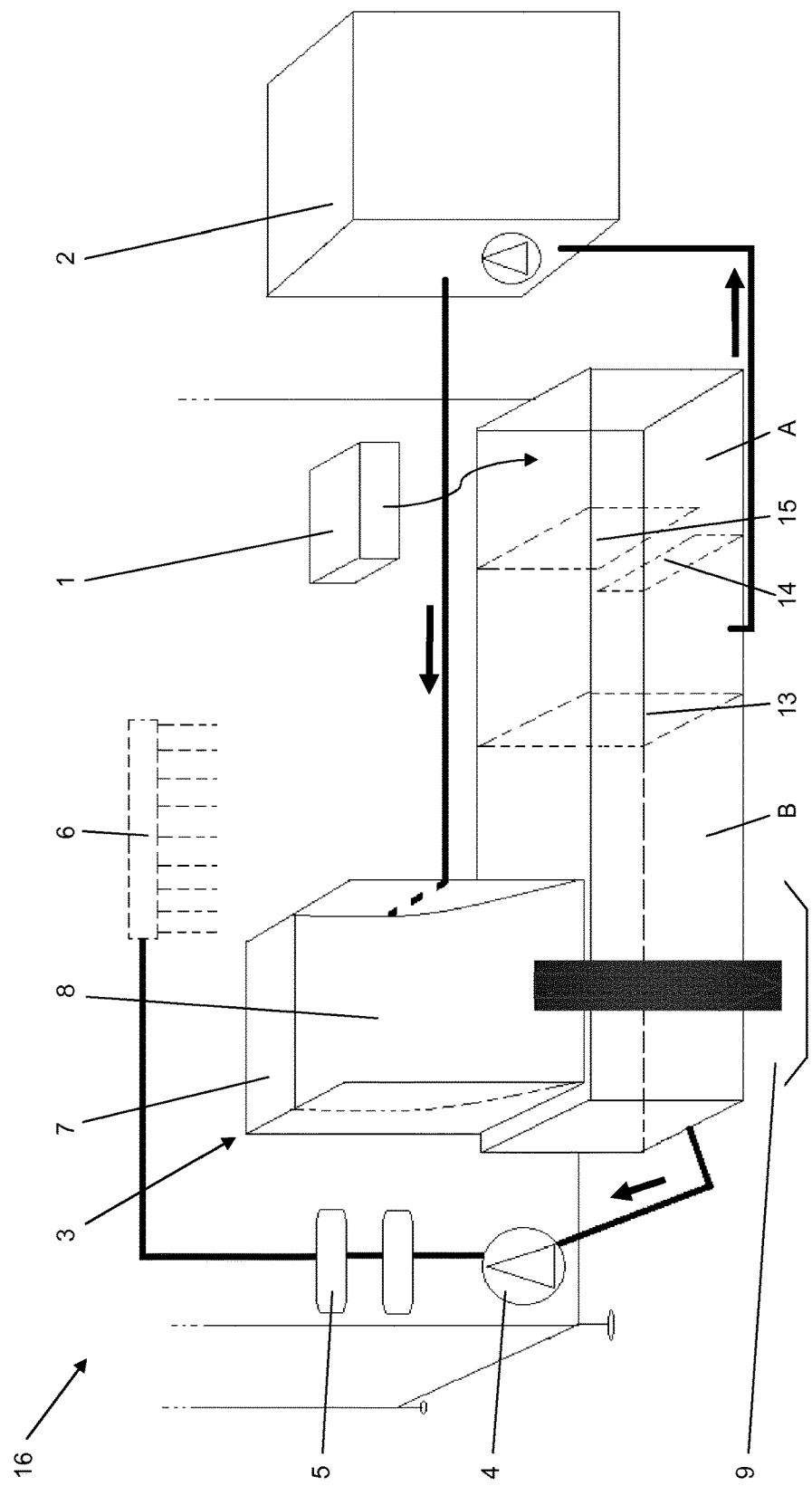

(51) Int. Cl.
*B01D 29/00* (2006.01)
*B01D 29/64* (2006.01)
*B08B 5/04* (2006.01)
*B08B 7/02* (2006.01)
*B08B 7/04* (2006.01)

(52) U.S. Cl.
CPC .................. *B08B 5/04* (2013.01); *B08B 7/02* (2013.01); *B08B 7/04* (2013.01); *A23V 2002/00* (2013.01); *Y02A 40/946* (2018.01)

(58) Field of Classification Search
USPC ..................................... 99/532–536; 210/330
See application file for complete search history.

(56) References Cited

U.S. PATENT DOCUMENTS

| | | | |
|---|---|---|---|
| 4,620,478 A | 11/1986 | Corominas | |
| 4,622,892 A * | 11/1986 | Corominas | A23B 4/285 99/533 |
| 5,246,579 A | 9/1993 | Probstmeyer | |
| 5,881,640 A * | 3/1999 | Rævsager | A23B 4/28 99/533 |
| 6,497,176 B2 * | 12/2002 | Basile | A23B 4/24 99/532 |
| 2002/0152901 A1 | 10/2002 | Basile et al. | |
| 2005/0077254 A1 | 4/2005 | Sawhill et al. | |
| 2005/0161376 A1 * | 7/2005 | Heidbreder | A23B 4/02 210/90 |
| 2006/0280849 A1 | 12/2006 | Singh et al. | |
| 2011/0052765 A1 | 3/2011 | Lyden | |
| 2014/0272035 A1 | 9/2014 | Estes et al. | |

FOREIGN PATENT DOCUMENTS

| | | |
|---|---|---|
| EP | 0072590 A2 | 2/1983 |
| EP | 0853885 A1 | 7/1988 |
| WO | 2010061406 A1 | 6/2010 |

OTHER PUBLICATIONS

International Preliminary Report on Patentability for International Application No. PCT/EP2015/077186, dated Nov. 9, 2016.

* cited by examiner

BRINE INJECTION SYSTEM WITH A FILTER

The present invention relates to a brine injection system with a plurality of needles, which are inserted into a product and through which brine is injected into the product, wherein brine which does not end up in the product is collected and recycled and wherein during recycling, the brine flows through a filter.

Such a system is well known from the state of the art. A needle head with a plurality of needles reciprocates from a remote- to an injection position, in which the needles have been pushed into a product which is marinated with a brine. A typical product is meat, poultry and/or fish but other products are also feasible. After the needles have entered the product, the brine is forced out of a hole(s) for example in the needle tip. In most cases not all of the brine ends up in the product and/or remains in the product after the injection. This brine is then collected and recycled. Before re-entering the needles, the return brine needs to be filtered. The filter system of a current injector system comprises a first rotating drum filter and eventually a second rotating drum filter, a suction filter and in-line filters. A first rotating drum filter will filter animal proteins, fat particles, bone- and cartilage-fragments from the return brine and transfers it towards a scraper which will scrape the filtrate off the drum and direct the filtrate into a reservoir. Harder particles like bone and cartilage are scraped-off easily while for example "jelly" meat proteins can penetrate through the filter openings and will be mixed with the filtered return brine due to the scraper action. In this case a second rotating drum filter will be provided downstream from the first drum filter in order to further filter the return brine. However, due to the active scraper action of this second filter, over time, loose floating material like "jelly" meat proteins can mix again with the filtered return- and fresh brine.

Therefore an additional suction filter will be used. Over time particles can also block the openings of this filter which will result in a reduced flow towards the manifold and needles and/or the loose particles will flow to the pump and through the needles and clog the needles.

Therefore in-line filters will be positioned after the pump and before the needles. Due to the positive pressure pump, smaller particles can even pass these in-line filters. Self-cleaning in-line filters can increase this effect by scraping the proteins through the drum of the filter. By the scraping action the filter openings can be blocked with for example "jelly" proteins. The penetrated material builds-up on the inside of the filter and flakes can detach and end-up in the hollow needles, these needles will be clogged which results in less injection performance.

Another disadvantage of the current filter system is the multitude of parts which all, at least once a day, must be disassembled from the injector, cleaned and thereafter reassembled. This is extremely time consuming and increases wear of the system.

It is therefore the objective of the present invention to avoid the problems according to the state of the art.

This problem is solved with a brine injection system with a plurality of needles, which are inserted into a product and through which brine is injected into the product, wherein brine which does not end up in the product is collected and recycled, wherein during recycling, the brine flows through a filter, wherein the filter comprises a filter element, along which the unfiltered brine flows and through which the filtered brine passes and which holds back residues in the unfiltered brine.

The present invention relates to a brine injection system, which comprises a plurality of needles, which are, in most cases provided in a needle head, which reciprocates from a remote- to an injection position, in which the needles have been pushed into a product which is marinated with a brine. A typical product is meat, poultry and/or fish but other products are also feasible. The brine is typically a watery solution with salt and/or other functional and/or taste enhancing substances. After the needles are in the product and/or before, the brine is forced out of a hole in the needle. However, not all of the injected brine ends up or remains in the product and is, according to the present invention, recycled, i.e. injected into a product again. Before this takes place, the recycled brine needs to be filtered, to remove fat, gel like particles, bone-pieces or the like from the brine which may clog the hollow needles.

The filtering is executed with a filter comprising a filter element, along which the unfiltered brine flows and through which the filtered brine passes and which holds back residues in the unfiltered brine. The held back residues are permanently or intermittently washed out of the filter with unfiltered or only partially filtered brine and preferably due to gravity. The filter in the inventive system has very few parts which need to be cleaned. This saves time and reduces damage due to wrong assembly. There are no scrapers to clean the filter and the filter-element does not rotate.

The filter element is preferably a screen. The filter element is preferably a modul, which can be removed from the filter easily and for example exchanged by a different modul and/or cleaned.

Preferably, the filter element is at least locally, preferably entirely, inclined relative to a vertical and/or horizontal plane. Due to this inclination, the brine need not be pumped but flows by gravity along the filter element. The angle of inclination may vary with the flow length of the brine. Preferably, the angle of inclination relative to a horizontal plane decreases with increasing flow-length. The angle of inclination is preferably between 0 and 90°.

Preferably filter element is at least locally curved. The radius of the curvature can vary within the filter design in a broad range preferably between 800 till 8000 mm and will more preferably be in a range from 1500 till 1800 mm.

The unfiltered brine flows along the filter element by gravity and/or is pumped along the filter element. The filtered brine is forced through the filter element by gravity and/or by increased pressure, which, according to a preferred embodiment, can be controlled. The increased pressure can, for example be achieved by a higher brine level on top of the filter element. The pressure level need not be the same over the entire flow length of the filter element, but may vary.

According to a preferred embodiment of the present invention, the permeability of the filter element varies with the flow-length of the brine along the filter element. More preferably, the permeability increases with the flow-length of the brine along the filter-element, i.e. initially, the permeability is rather small and then increases as the brine proceeds along the filter element towards the end of the filter element. The permeability may change continuously or stepwise. According to a preferred embodiment, the permeability of the filter element can be adjusted. This adjustment may be executed manually or automatically.

Preferably, the filter element is a screen, preferably a slotted screen, wherein the size of the slots preferably varies with the flow length of the unfiltered brine along the filter element. Preferably, the size of the slots/holes in the screen are initially smaller and then increases with the flow length of the unfiltered brine.

Preferably, the system comprises a chiller for the recycled brine, which is preferably located upstream from the filter. The chiller preferably cools the brine down to 2-4° C. and/or maintains the brine at this temperature range. Preferably, the chiller comprises a pump, which pumps the recycled brine from a reservoir to the filter.

According to a preferred embodiment of the present invention, the filter element vibrates to increase the filter-capacity of the filter element, particularly to improve removal of the residues.

According to a preferred embodiment, the system comprises an extra filter upstream from the needles and downstream from the main filter. Preferably, this extra filter comprises two filters, which are arranged in parallel, wherein only one filter is used. The other filter is stand by or can be cleaned in the meantime.

According to a preferred embodiment, the inventive brine injection system comprises a cleaning system, preferably a vacuum cleaner. The cleaning system removes particles, preferably meat-particles, and/or semi-solid particles, like jellylike particles from the surface of the filter element, so that this surface is not clogged. The vacuum cleaner is preferably designed such that it only removes solid particles, like meat-particles, and/or semi-solid particles, like jellylike particles, from the filter element and as little liquid brine as possible.

Preferably, the vacuum cleaner comprises a nozzle through which the particles are sucked in.

Preferably, the cleaning system comprises a moving device, which moves the cleaning system relative to the filter element of the main filter. This moving device can move in one or two directions parallel to the surface of the filter element. In case the filter element moves only in one direction, the width of the nozzle, in the direction perpendicular to its direction of movement, is preferably at least essentially like the width of the filter element. In case the moving device moves in two directions, the width of the nozzle is preferably smaller than the width of the cleaning device. The two direction of movement are preferably perpendicular to each other.

The surface of the filter element can be cleaned entirely or only partially.

Preferably, the cleaning system operates continuously or intermittently.

Preferably, the cleaning system comprises a sensor, which measures the flow of brine through the filter element. The signal of this sensor is preferably utilized to control the cleaning system. In case the flow of brine through the filter element falls below a certain level, the cleaning system can be activated.

Preferably, the cleaning system comprises recycle means to recycle brine, which is sucked in by the cleaning system.

The invention is now explained according to the Figures. These explanations do not limit the scope of protection.

Figure 2:
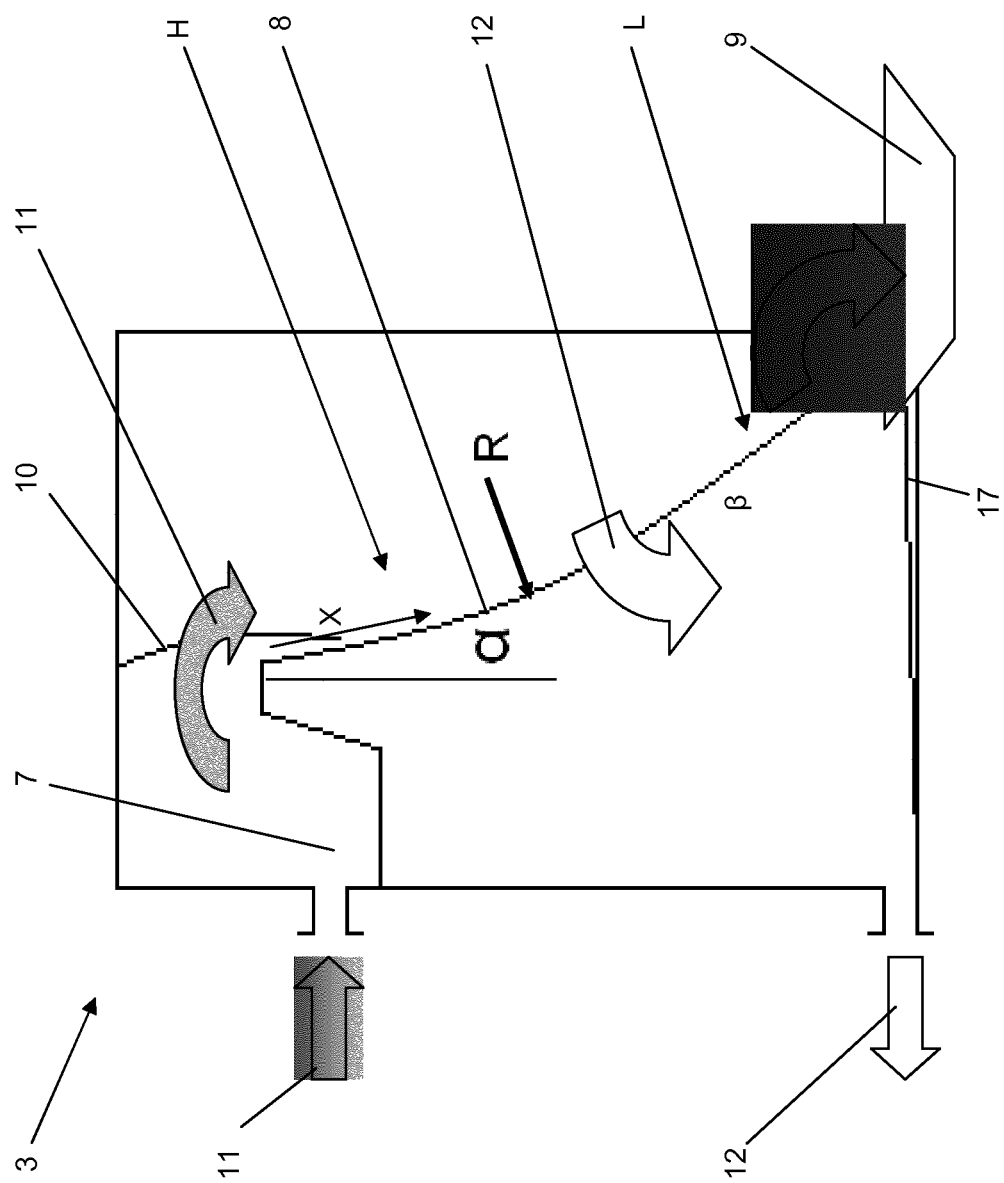
Figure 3:
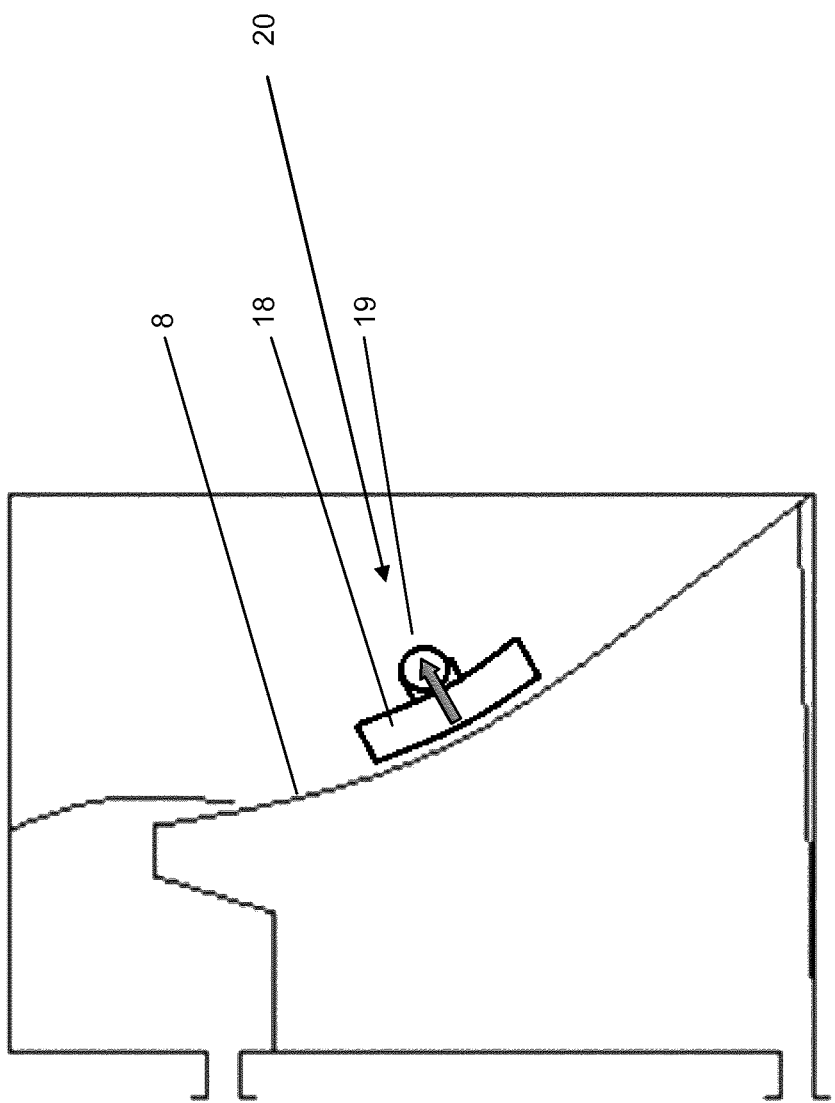

FIG. 1 shows the inventive system.
FIG. 2 shows details of the filter.
FIG. 3 shows the cleaning device.

FIG. 1 shows the inventive system 16. The system comprises a needle-head 6 with a multitude of needles, which are reciprocated from a remote- to an injecting position. In the injection position, the needles stick in a product, for example meat, poultry, fish or vegetables and a brine is forced through the hollow needles into the product. Surplus brine is collected, for example underneath the belt of the injector which transports the product below the needles and away and the brine flows via out-flow 1 to segment "A" of a brine tank. In segment "A" the return brine can be polluted with proteins, fat particles, bone- and cartilage-fragments. As a first cleaning step, two optional plates 14, 15, one connected at the top of the tank and a small one connected at the bottom of the tank are positioned a distance from each other such that heavier material could descend and fat will float on top.

In the embodiment according to FIG. 1, a GEA Super-Chill® 2 is used to pump the eventually pre-cleaned return brine from tank "A" into an integrated cooling block so that the brine temperature of preferably 2-4° C. will be maintained. In case the return brine temperature and environment temperature will not influence the preferred brine temperature range, the GEA SuperChill® could also be replaced with a conventional pump and a control system to turn the pump on/off and manage the flow speed and level control in tank "A" to protect the pump for dry-pumping. The GEA SuperChill® or the separate pump pumps the return brine towards the inlet connection at the back of main filter 3 as shown in FIG. 2. In the optional reservoir 7 of the filter 3 the pumped return brine collects and will start to over-flow over the filter element 8. A weir 10 can be provided to force the unfiltered brine towards the filter element 8.

Flow speed and amount of return brine is depending on the injection rate, e.g. injection mode, pump pressure and/or needle-head speed but also on belt load, product, brine type etc. but can be easily managed by the flow regulator of the pump 2. The filtrate will flow out of the filter 3 and will be collected in tank segment "B". Here it will preferably be mixed with cold and fresh brine, which has a preferred temperature of 2-4° C. The brine is then pumped via injector pump 4 through one of the in-line filters 5, which are, however, only optional. In case any material is dropped in segment "B" accidentally, for example by human interference, the in-line filter(s) will catch this debris. Preferably these filters 5 are provided by-passable such that one filter can be taken out to inspect/clean without interrupting the production. Valves will control which filter is in use before the brine is consumed by the injector's manifold and needles 6.

Referring now to FIG. 2, the unfiltered or pre-filtered brine 11 is flowing along the filter element 8, indicated by the arrow X, which depicts the flow length of the brine along the filter element. As the brine flows along the filter element 8, a portion of filtered brine 12 will pass the filter element 8 and will be caught beneath the filter element 8. Here a sloped bottom 17 guides the filtered brine to an exit, which is connected to the tank in segment "B". The residues accumulate at the top of the filter element 8 and will be washed out by the stream of unfiltered brine 11 and here due to gravity. At the end of the filter element 8, the residues are collected in a reservoir 9 and discharged. The filter element 8 is preferably a modular build-up screen deck. Depending on the brine viscosity, brine ingredients, pollution degree and used needles in the injector, optimization of the filter process can be desirable. This can be achieved in different ways, for example by adjusting the angle of inclination α and or β of screen 8 and/or varying the permeability, for example the mesh size when using a slotted screen, with the flow length X of the brine, by, for example, choosing a smaller permeability at location "H", i.e. a smaller flow length and a larger permeability at location "L", i.e. a larger flow length. The angle of inclination α is preferably smaller at the smaller flow length of the brine along the filter element and preferably increases at least locally with increasing flow length. This results in higher velocity of the unfiltered brine at the beginning of the filtering process, which decreases with increasing flow length. To improve the slide and/or roll down of residue, the filter element 8 is preferably curved as shown by reference sign "R". In case an optimization of the filter process is not sufficient a filter element 8 with a different slope, for example curvature "R" can be used. The filter elements 8 are preferably provided as moduls and can be exchanged based on the desired application. Further optimization can be achieved by using a vibrating screen 8.

FIG. 3 shows the cleaning system 20, which is in the present case a nozzle 18 which is connected to a vacuum source to remove solid- and/or jellylike-particles from the surface of the filter element 8. This is done to avoid clogging of the filter element 8. The cleaning system is designed such that it preferably removes as little brine from the surface of the filter element as possible. The cleaning system 20, preferably the nozzle 18 is preferably connected to a moving device (not depicted), which moves the cleaning system 20 and/or the nozzle 18 relative to the surface of the filter element. The moving device can move the cleaning system 20 and/or the nozzle in one or two directions parallel to the surface of the filter element 8. The moving pattern preferably depends on the size of the cleaning device and/or the nozzle.

The surface of the filter element 8 can be cleaned partially or entirely. The cleaning can take place continuously or intermittently. The cleaning system may comprise a sensor which, for example, measures directly or indirectly, the flow through the filter element. Depending on the signal of the sensor, the cleaning system is either activated or deactivated.

Preferably, the cleaning system comprises a sensor which measures the amount of brine removed from the surface of the filter element 8. In case this amount is too large, the cleaning system is either adjusted and/or stopped.

Brine removed from the surface of the cleaning system is preferably recycled to the system and reused.

LIST OF REFERENCE SIGNS

1 outflow
2 pump, chiller
3 main filter
4 pump
5 inline filter
6 needles, needle-head
7 reservoir
8 filter element
9 residues
10 weir
11 flow of unfiltered brine
12 flow of filtered brine
13 separation tank
14 separation plate
15 separation plate
16 brine injection system
17 sloped bottom
18 nozzle vacuum cleaner
19 connection to vacuum cleaner
20 cleaning system, vacuum cleaner
A first segment tank
B second segment tank
H filter region with a first permeability
L filter region with a second permeability
R curvature of the filter element
X flow direction of the brine, flow length
$\alpha$ angle of inclination, relative to a vertical plane
$\beta$ angle of inclination, relative to a horizontal plane

The invention claimed is:

1. A brine injection system comprising:
   a plurality of needles, which are inserted into a product and through which brine is injected into the product, and
   a filter,
   wherein the brine which does not end up in the product is collected and recycled,
   wherein during recycling of the brine, the brine flows through the filter,
   wherein the filter comprises a filter element along which unfiltered brine flows and through which filtered brine passes and which holds back residues in the unfiltered brine,
   wherein the filter element is at least locally curved, and
   wherein a permeability of the filter element varies with a flow-length of the brine along the filter element.

2. The brine injection system according to claim 1, wherein the filter element is at least locally inclined relative to a vertical and/or horizontal plane.

3. The brine injection system according to claim 1, wherein the brine flows along and through the filter element by gravity.

4. The brine injection system according to claim 1, wherein the permeability of the filter element increases with the flow-length of the brine along the filter element.

5. The brine injection system according to claim 1, wherein the system comprises a chiller for the brine.

6. The brine injection system according to claim 1, wherein the filter element is a screen.

7. The brine injection system according to claim 1, wherein the filter element vibrates.

8. The brine injection system according to claim 1, wherein the system comprises an extra filter upstream from the needles.

9. The brine injection system according to claim 1, wherein the system comprises a cleaning system.

10. The brine injection system according to claim 9, wherein the system comprises a moving device, which moves the cleaning system relative to the filter element of the filter.

11. The brine injection system according to claim 9, wherein the cleaning system operates continuously or intermittently.

12. The brine injection system according to claim 9, wherein the system comprises a sensor, which measures a flow of the brine through the filter element, and a signal of the sensor is utilized to control the cleaning system.

13. The brine injection system according to claim 9, wherein the system comprises a recycle means to recycle the brine, which is sucked in by the cleaning system.

14. The brine injection system according to claim 1, wherein the filter element is a slotted screen.

15. The brine injection system according to claim 1, wherein the system comprises a vacuum cleaner.

16. The brine injection system according to claim 1, wherein an angle of inclination of the filter element relative to a horizontal plane decreases with increased flow-length.

17. The brine injection system according to claim 1, wherein a radius of curvature of the filter element is in a range from 1500 to 1800 mm.

18. The brine injection system according to claim 1, wherein the permeability of the filter element is adjustable.

19. A system comprising:
    a plurality of needles, the needles are inserted into a product and through which brine is injected into the product;

a filter comprising a filter element, the filter element is curved and inclined relative to a horizontal plane so that the brine flows along and through the filter element by gravity, a radius of curvature of the filter element is in a range from 1500 to 1800 mm, the filter element is a screen that vibrates to increase filter capacity of the filter element, the filter element is a slotted screen;

an extra filter upstream from the needles;

a chiller for the brine;

a cleaning system;

a moving device that moves the cleaning system relative to the filter element in one or two directions parallel to a surface of the filter element;

a sensor that measures a flow of the brine through the filter element, wherein a signal from the sensor is used to activate or deactivate the cleaning system;

a recycle means to recycle brine that is collected by the cleaning system;

wherein the brine which does not end up in the product is collected by the cleaning system and recycled in the recycle means;

wherein during recycling of the brine, the brine that does not end up in the product flows through the filter;

wherein unfiltered brine flows along the filter element, through which filtered brine passes and which holds back residues in the unfiltered brine; and wherein a permeability of the filter element increases with a flow-length of the brine along the filter element.

20. The system according to claim 19, wherein the permeability of the filter element is adjustable.

* * * * *